United States Patent
Lee et al.

(10) Patent No.: US 12,000,410 B2
(45) Date of Patent: Jun. 4, 2024

(54) SHROUD FOR AN AIR MOVING DEVICE

(71) Applicant: Toyota Motor Engineering & Manufacturing North America, Inc., Plano, TX (US)

(72) Inventors: Taehwa Lee, Ann Arbor, MI (US); Tsuyoshi Nomura, Nagoya (JP); Ercan Mehmet Dede, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/826,686

(22) Filed: May 27, 2022

(65) Prior Publication Data
US 2023/0383767 A1    Nov. 30, 2023

(51) Int. Cl.
*F04D 29/66* (2006.01)
*B64C 27/20* (2023.01)
*B64C 39/02* (2023.01)
*B64U 30/20* (2023.01)

(52) U.S. Cl.
CPC ............ *F04D 29/663* (2013.01); *B64C 27/20* (2013.01); *B64C 39/024* (2013.01); *B64C 2220/00* (2013.01); *B64U 30/20* (2023.01)

(58) Field of Classification Search
CPC ...... F04D 29/663; F04D 29/665; F04D 25/08; B64C 27/20; B64C 39/024; B64C 2220/00; B64U 30/20; B64D 2033/0206; F05D 2260/963; F05D 2260/96
See application file for complete search history.

(56) References Cited

U.S. PATENT DOCUMENTS

| | | | |
|---|---|---|---|
| 4,596,921 A * | 6/1986 | Hersh | A45D 20/10 392/385 |
| 10,814,966 B2 | 10/2020 | Rowe et al. | |
| 11,217,217 B2 | 1/2022 | Ratner | |
| 2003/0183446 A1 * | 10/2003 | Shah | F15D 1/02 181/205 |
| 2008/0292449 A1 * | 11/2008 | Lefevre | F04D 29/665 415/58.4 |
| 2011/0091323 A1 * | 4/2011 | Koike | F04D 29/665 416/175 |
| 2020/0340497 A1 * | 10/2020 | Lombard | F01D 9/04 |
| 2022/0389939 A1 * | 12/2022 | Hakuta | F04D 19/002 |

FOREIGN PATENT DOCUMENTS

KR    101790281 B1    10/2017

* cited by examiner

*Primary Examiner* — Courtney D Heinle
*Assistant Examiner* — Andrew Thanh Bui
(74) *Attorney, Agent, or Firm* — Christopher G. Darrow; Darrow Mustafa PC (57) ABSTRACT

A shroud for an air moving device includes a shroud body configured to at least partially surround one or more blades. The shroud body defines an annular cavity and an annular opening. The annular opening faces the one or more blades. The shroud also includes a Helmholtz resonator defined by the annular cavity and the annular opening. The Helmholtz resonator is configured to reflect sound generated by the one or more blades out of the shroud body.

18 Claims, 5 Drawing Sheets

SHROUD FOR AN AIR MOVING DEVICE

TECHNICAL FIELD

The subject matter described herein relates, in general, to sound mitigation systems and, more specifically, to sound mitigation systems for air moving devices such as aerial vehicles and fans.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

Air moving devices may include blades configured to move air and one or more shrouds configured to surround the blades. The shroud(s) can be configured to direct air flow through the air moving device and protect the blades from damage. Air moving devices can include fans, aerial vehicles, etc. However, the movement of the blades by air moving devices may cause the emission of unwanted noise. This problem becomes more pronounced when multiple air moving devices are utilized.

SUMMARY

This section generally summarizes the disclosure and is not a comprehensive explanation of its full scope or all its features.

In one embodiment, a shroud for an air moving device includes a shroud body configured to at least partially surround one or more blades. The shroud body defines an annular cavity and an annular opening. The annular opening faces the one or more blades. The shroud also includes a Helmholtz resonator defined by the annular cavity and the annular opening. The Helmholtz resonator is configured to reflect sound generated by rotation of the one or more blades out of the shroud body.

In another embodiment, a shroud for an air moving device includes a shroud body configured to at least partially surround one or more blades. The shroud body defines a hollow interior and an annular opening. The shroud also includes one or more walls located inside the hollow interior and configured to divide the hollow interior into a plurality of cavities. The shroud further includes a plurality of Helmholtz resonators defined by the plurality of cavities and the annular opening. The Helmholtz resonators are configured to reflect sound generated by rotation of the one or more blades out of the shroud body.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is a sound mitigating system for an air moving device such as an aerial vehicle or a fan. The sound mitigating system may form at least a portion of the shroud and can include a shroud body configured to at least partially surround one or more blades of the air moving device. The shroud body defines an annular cavity and an annular opening facing the blades and includes a Helmholtz resonator defined by the annular cavity and the annular opening.

The Helmholtz resonator is configured to reflect sound generated by the rotation of the blades out of the shroud body. In some arrangements, the shroud can include a hollow interior, one or more walls configured to divide the hollow interior into a plurality of cavities, and a plurality of Helmholtz resonators defined by the cavities and the annular opening. In other arrangements, the shroud can include a hollow interior, one or more walls configured to divide the hollow interior into a plurality of cavities, one or more annular openings, and a plurality of Helmholtz resonators defined by the cavities and the annular opening(s). In some instances, the plurality of Helmholtz resonators may be configured to reflect a different resonant frequency of the sound produced by the rotation of the blades.

Figure 1:
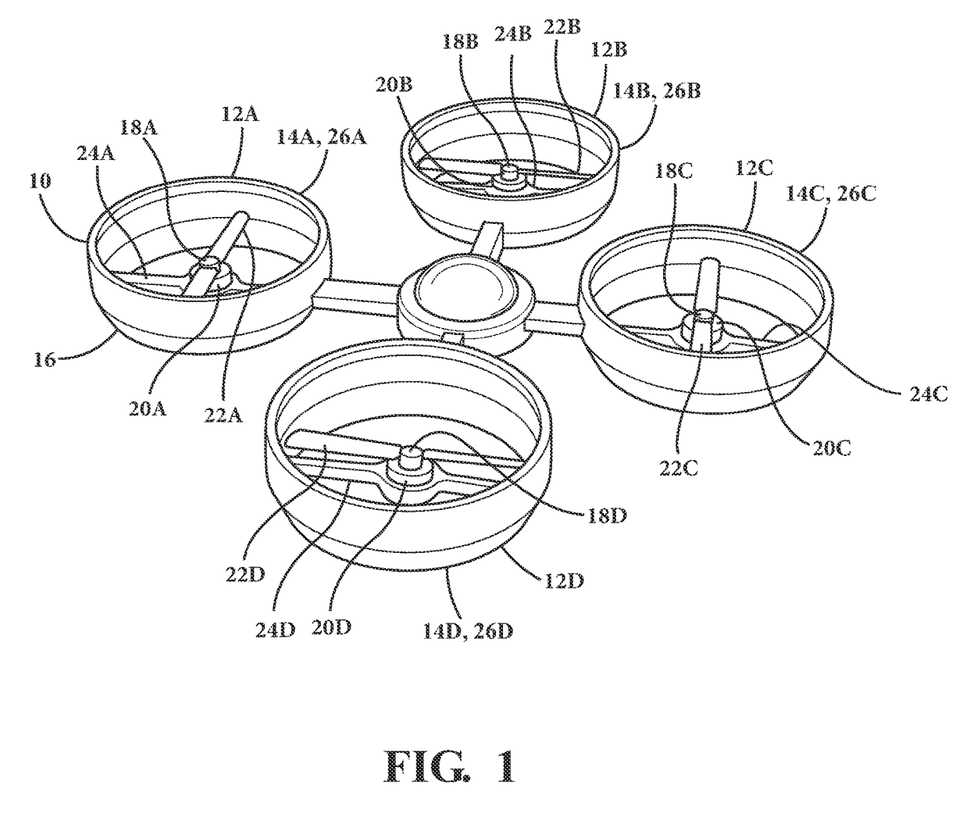
FIG. 1 illustrates an example of an air moving device including a shroud, where the air moving device is an aerial vehicle.

Referring to FIG. 1, illustrated is an aerial vehicle 10 that utilizes multiple air moving devices that incorporate sound mitigating systems. In this example, the vehicle 10 includes rotors 12A, 12B, 12C, and 12D that act as air moving devices that move air to provide lift and/or movement to allow the vehicle 10 to move. As will be explained in greater detail later in this description, the rotors 12A-12D can include shrouds 14A, 14B, 14C, and 14D that can effectively reduce unwanted noise generated by the operation of the rotors 12A-12D.

While the shrouds 14A, 14B, 14C, and/or 14D can be used in a variety of different air moving applications, in this example, they are used in conjunction with the vehicle 10. The vehicle 10 can be any type of vehicle that uses the movement of air to cause movement of the vehicle. For example, the vehicle 10 can include a vertical takeoff and landing (VTOL) vehicle, an electric vertical takeoff and landing (eVTOL) vehicle, an unmanned aerial vehicle (UAV), a drone, a rotorcraft, a quadcopter, fixed-wing aircraft, etc. Furthermore, the vehicle 10 can also include land-based vehicles or watercraft that utilize air movement to provide adequate force to propel the vehicle. Examples of these types of vehicles include hovercraft, airboats, and wheeled vehicles that use the movement of air for propulsion.

In this example, the vehicle 10 includes a body 16 having rotors 12A, 12B, 12C, and 12D. As shown, the body 16 includes four rotors 12A-12D, but the vehicle 10 can include any suitable number of rotors. Each rotor 12A-12D can include the shroud 14A-14D. More specifically, rotor 12A includes shroud 14A, rotor 12B includes shroud 14B, rotor 12C includes shroud 14C, and rotor 12D includes shroud 14D.

Generally, the rotors 12A-12D may include propellers 18A, 18B, 18C, and 18D that are driven by motors 20A-20D, respectively. In this example, the propellers 18A-18D each have one or more blades 22A, 22B, 22C, and 22D that are pitched such that their rotational movement will cause the movement of air. Each propeller 18A-18D includes two blades 22A-22D, but the propellers 18A-18D can include any suitable number of blades 22A-22D. One or more of the propellers 18A-18D can include the same number of blades 22A-22D or one or more of the propellers 18A-18D can include different numbers of blades 22A-22D. The rotors 12A-12D can also include mounts 24A, 24B, 24C, and 24D configured to mount the propellers 18A-18D and/or the motors 20A-20D.

When the motors 20A-20D cause the blades 22A-22D of the propellers 18A-18D to rotate at an appropriate speed, lift is created that allows the vehicle 10 to fly. However, the movement of air that creates this lift can result in unwanted noise. As will be explained in greater detail in the following paragraphs, the shrouds 14A-14D can reduce this unwanted noise. Moreover, each of the shrouds 14A-14D may include a shroud body 26A, 26B, 26C, and 26D. More specifically, shroud 14A includes shroud body 26A, shroud 14B includes shroud body 26B, shroud 14C includes shroud body 26C, and shroud 14D includes shroud body 26D. This description follows with reference to rotor 12A, shroud 14A, propeller 18A, motor 20A, and blades 22A. However, it will be understood that this description applies to rotors 12B-12D, shrouds 14B-14D, propellers 18B-18D, motors 20B-20D, and blades 22B-22D.

The shroud body 26A is configured to at least partially surround the blades 22A. By at least partially surrounding the blades 22A, the shroud body 26A is configured to direct air flow produced by rotation of the blades 22A, protect the blades 22A from objects external to the shroud 14A, and prevent objects from entering the shroud 14A and contacting the blades 22A. The shroud body 26A may be formed from any suitable material, such as plastic, steel, aluminum, and the like, and may be formed in any suitable manner.

Figure 2:
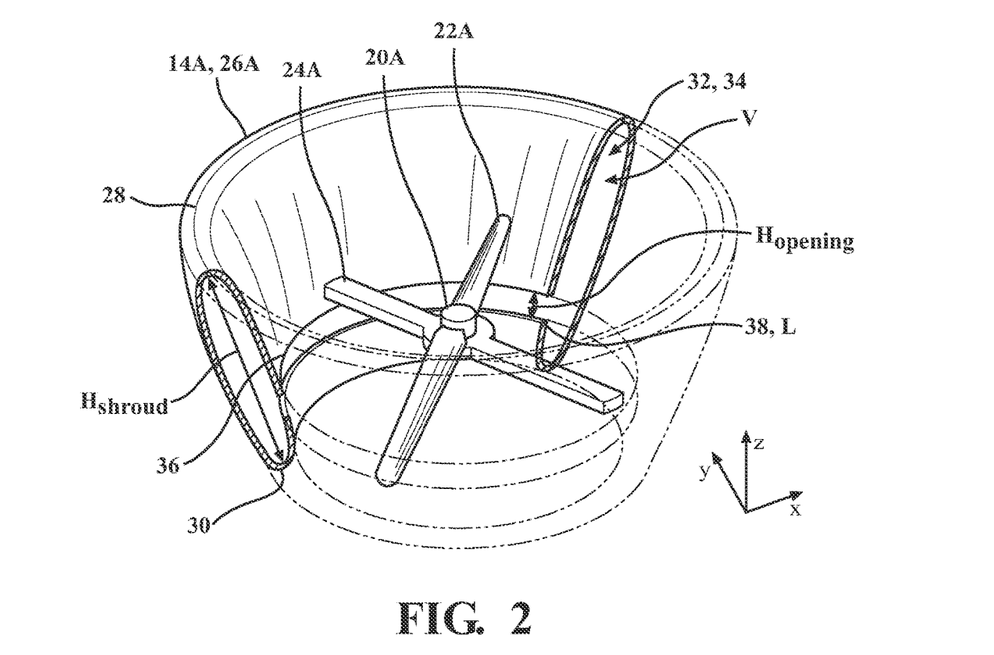
FIG. 2 illustrates an example of a shroud for an air moving device, the shroud including an annular cavity, an annular opening, and a Helmholtz resonator defined by the annular cavity and the annular opening.

With additional reference to FIG. 2, the shroud body 26A can have a generally conical shape and can define a top edge 28 and a bottom edge 30. In some instances, as shown, the top edge 28 may define a larger circumference than the bottom edge 30, but in other instances, the bottom edge 30 may define a larger circumference than the top edge 28. The shroud body 26A can also define a height $H_{shroud}$, which can be the distance between the top edge 28 and the bottom edge 30. In some instances, the shroud body 26A can be substantially hollow.

As mentioned before, the blades 22A, when rotated by the motor 20A, may produce sound waves that exit the shroud 14A and that are heard by a person near the vehicle 10. For example, rotation of the blades 22A by the motor 20A may produce sound waves that exit the shroud 14A through the bottom of the shroud 14A (e.g., in a direction generally opposite the z-axis). In some instances, it may be advantageous to mitigate the amount of sound heard by a person near the vehicle 10. For example, if the vehicle 10 is used in connection with surveillance, it may be advantageous to configure the vehicle 10 to transmit as little sound as possible.

Accordingly, referring to FIG. 2, the shroud 14A can include a Helmholtz resonator 32. The Helmholtz resonator 32 is an enclosed volume of air communicating with the external environment of the air moving device through an opening, causing the enclosed air to resonate at a frequency depending on the volume and geometry of the Helmholtz resonator 32. The Helmholtz resonator 32 may be defined by the shroud body 26A. More specifically, the shroud body 26A can define an annular cavity 34, which encloses a volume of air, and an annular opening 36 facing the blades 22A. The Helmholtz resonator 32 can be defined by the annular cavity 34 and the annular opening 36. The Helmholtz resonator 32, through the annular cavity 34 and the annular opening 36, may be configured to reflect sound waves out of the top of the shroud 14A (e.g., in a direction generally along the z-axis).

The Helmholtz resonator 32 may define a resonant frequency, which can be the frequency of the sound waves that the Helmholtz resonator 32 reflects. The resonant frequency may be a function of various dimensions of the annular cavity 34, the annular opening 36, and the shroud body 26. Moreover, the resonant frequency can be based on the frequency of the sound waves produced by rotation of the blades 22A.

For example, with continued reference to FIG. 2, the annular cavity 34 can define a volume V and the annular opening 36 can define a height $H_{opening}$. In some arrangements, the height $H_{opening}$ may be relatively small compared to the height $H_{shroud}$. For example, the height $H_{opening}$ can be substantially 25% or less of the height $H_{shroud}$. The annular opening 36 can also define a neck 38 that extends to the annular cavity 34. The neck 38 can define a length L. In some arrangements, the length L may be defined by a thickness of the shroud body 26A. Moreover, the annular opening 36 can define a cross-sectional area A, which is a product of the height $H_{opening}$ and the circumference of the shroud 14A.

The resonant frequency of the Helmholtz resonator 32 may be a function of these variables and can be defined by the following equations, where $f_H$ is the resonant frequency, v is the speed of sound in a gas, γ is the adiabatic index of the gas (e.g., 1.4 for air), $P_0$ is the static pressure in the cavity, and $\rho$ is the mass density:

$$f_H = \frac{v}{2\pi}\sqrt{\frac{A}{VL}} \quad v = \sqrt{\gamma\frac{P0}{\rho}} \quad \rho = \frac{m}{V_n}.$$

Figure 3A:
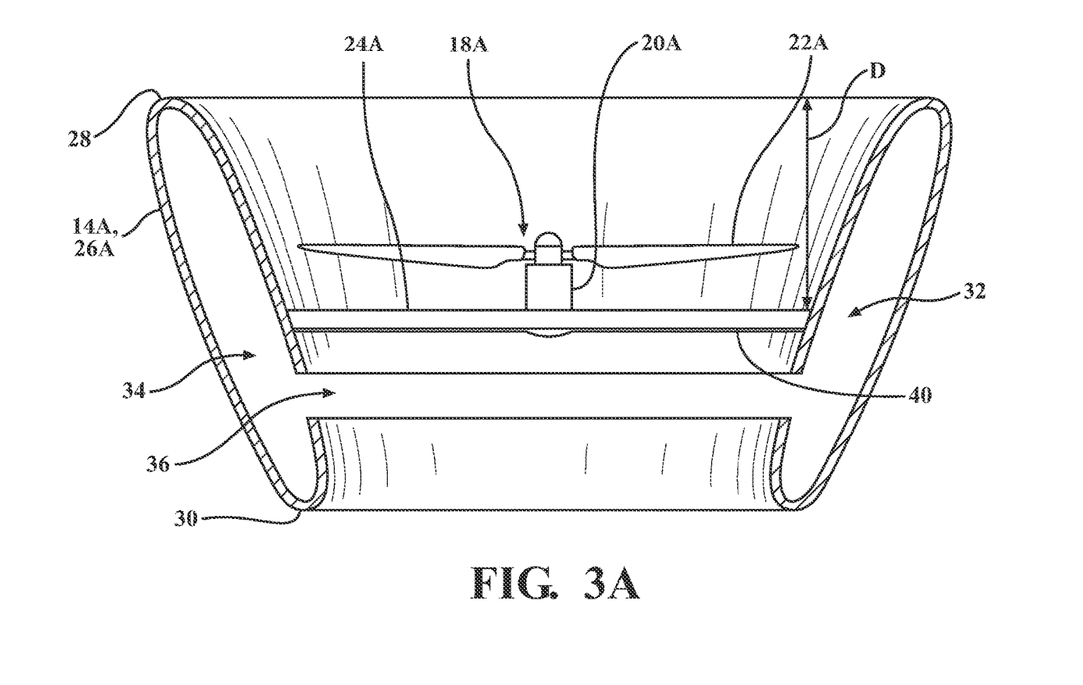
FIG. 3A illustrates an example of the shroud of FIG. 1 including one or more blades located between a top edge of the shroud and the annular opening.
Figure 3B:
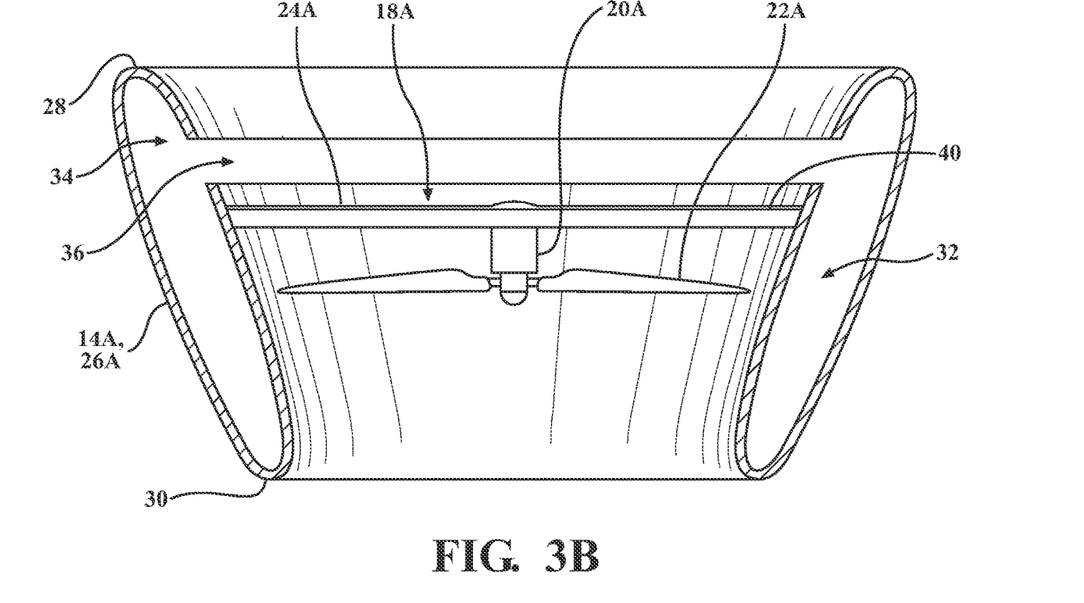
FIG. 3B illustrates an example of the shroud of FIG. 1 including one or more blades located between a bottom edge of the shroud and the annular opening.
Figure 4:
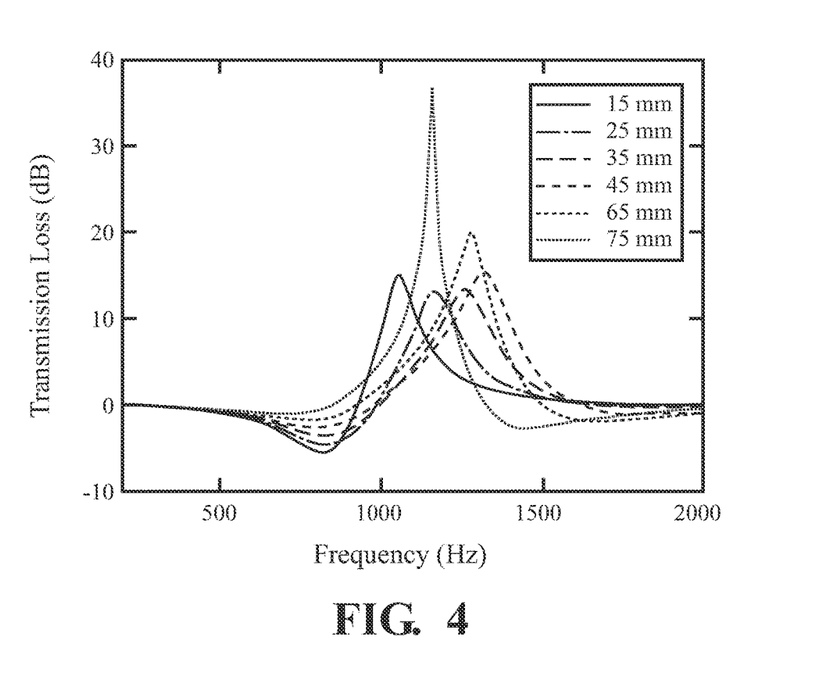
FIG. 4 illustrates the transmission loss of the shroud with the Helmholtz resonator for a range of frequencies produced by rotation of one or more blades located within the shroud.

Referring now to FIGS. 3A and 3B, a cross-section of the shroud 14A of FIG. 2 is shown. FIGS. 3A and 3B depict the propeller 18A connected to the shroud body 26A by the mount 24A in various locations. With specific reference to FIG. 3A, the propeller 18A can be located between the top edge 28 and the annular opening 36. More specifically, the mount 24A can be attached to the shroud body 26A between the top edge 28 and the annular opening 36. Alternatively, as shown in FIG. 3B, the propeller 18A can be located between the bottom edge 30 and the annular opening 36. More specifically, the mount 24A can be attached to the shroud body 26A between the bottom edge 30 and the annular opening 36. With continued reference to FIG. 3A and with additional reference to FIG. 4, the amount of sound reflected by the Helmholtz resonator 32 may be a function of the distance D from the top edge 28 to the annular opening 36. More specifically, the transmission loss measured from an observation point located below the bottom edge 30 (for example, by a person standing underneath the vehicle 10) is a function of the distance D. The transmission loss may be characterized by the following equation, where $P_{wi}$ is the pressure measured at the observation point with the Helmholtz resonator 32 and $P_{wo}$ is the pressure measured at the observation point without the Helmholtz resonator 32:

$$\text{Transmission loss} = 20 \log\left(\frac{P_{wi}}{P_{wo}}\right)$$

FIG. 4 shows the transmission loss in decibels (dB) for a range of frequencies produced by rotation of the blades 22A from about 0 Hz to about 2000 Hz. In some arrangements, the transmission loss may be optimized when the distance D is about 15 millimeters (mm). However, the transmission loss may generally be optimized according to the resonant frequency produced by rotation of the blades 22A.

Figure 5A:
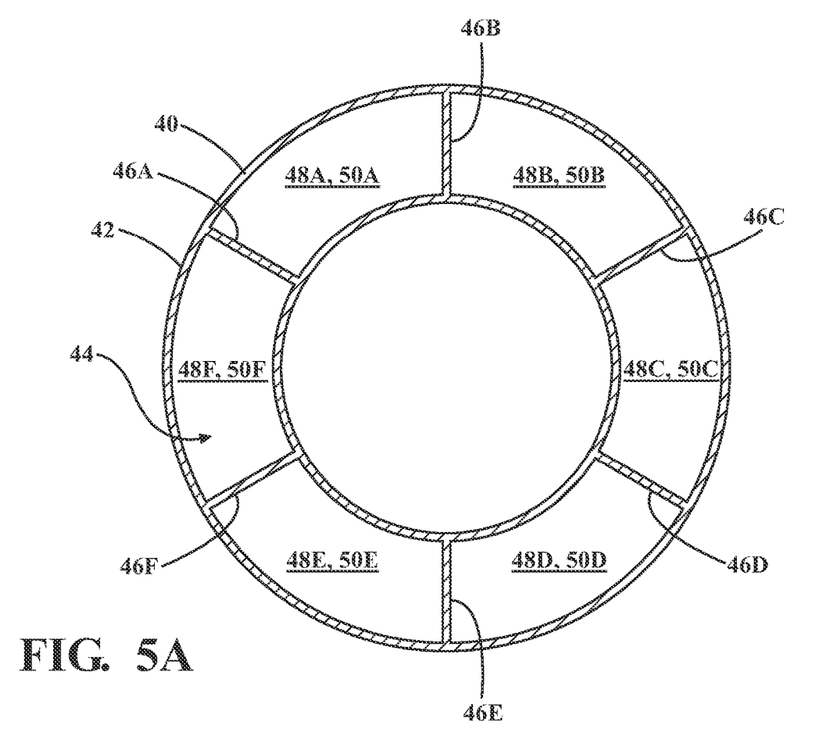
FIG. 5A illustrates a top-down view of a shroud for an air moving device including a hollow interior, a plurality of walls configured to divide the hollow interior into a plurality of cavities, an annular opening, and a plurality of Helmholtz resonators defined by the cavities.
Figure 5B:
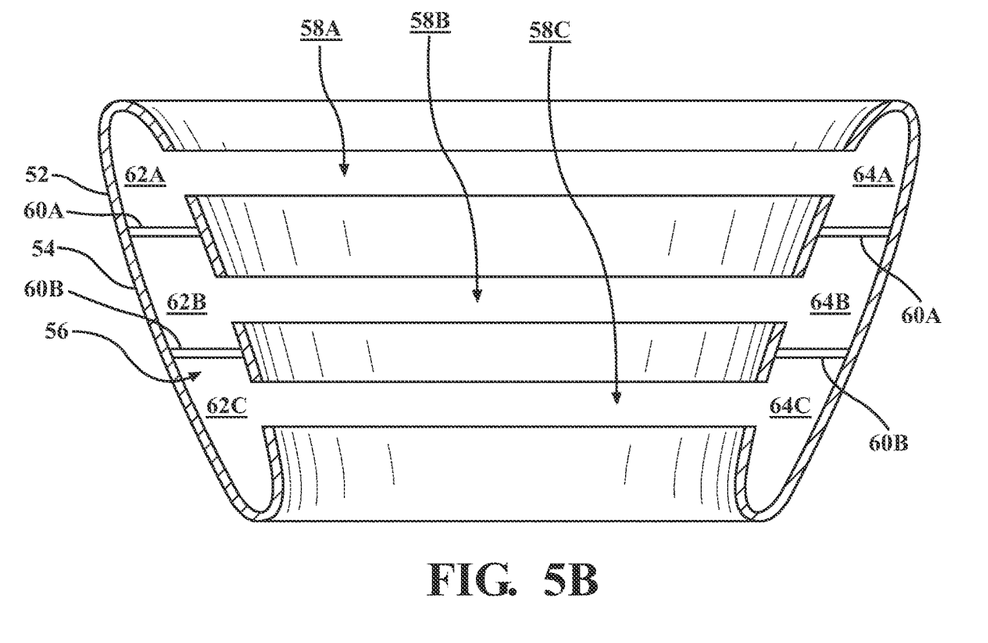
FIG. 5B illustrates a cross-sectional view of a shroud for an air moving device including a hollow interior, a plurality of walls configured to divide the hollow interior into a plurality of cavities, a plurality of annular openings, and a plurality of Helmholtz resonators defined by the cavities and the annular openings.

Referring now to FIGS. 5A and 5B, variations of the shroud 14A of FIG. 2 are shown. With reference to FIG. 5A, a top-down view of a shroud 40 is shown. The shroud 40 includes a shroud body 42 that defines a hollow interior 44 and an annular opening (not shown). The shroud 40 also includes one or more walls 46A, 46B, 46C, 46D, 46E, and 46F located inside the hollow interior 44 that are configured to divide the hollow interior 44 into a plurality of cavities 48A, 48B, 48C, 48D, 48E, and 48F. As shown, the shroud 40 includes 6 walls 46A-46F configured to divide the hollow interior 44 into 6 cavities 48A-48F. However, the shroud 40 can include any suitable number of walls dividing the hollow interior 44 into any suitable number of cavities. The wall(s) 46A-46F may extend from a top edge of the shroud 40 to a bottom edge of the shroud 40 (e.g., the wall(s) 46A-46F can extend generally longitudinally along the z-axis shown in FIG. 1). Each of the cavities 48A-48F can define a volume. Additionally, the annular opening can define a height and a neck that extends to the cavities 48A-48F. The thickness of the shroud body 42 can also defines a length of the neck.

The shroud 40 also includes a plurality of Helmholtz resonators 50A, 50B, 50C, 50D, 50E, and 50F defined by the cavities 48A-48F and the annular opening. As shown, the shroud 40 includes 6 Helmholtz resonators 50A-50F defined by the cavities 48A-48F and the annular opening. However, the shroud 40 can include any suitable number of Helmholtz resonators. Like the Helmholtz resonator 32 of FIGS. 2-3B, the Helmholtz resonators 50A-50F of FIG. 5A are configured to reflect sound generated by rotation of the blades out of the shroud body 42. Each of the Helmholtz resonators 50A-50F can define a resonant frequency, which may be a function of the volume of the cavity 48A-48F, the cross-sectional area of the annular opening, and the length of the neck. The resonant frequency of the Helmholtz resonators 50A-50F may be based on the frequency of the sound emitted by rotation of the blades. In some arrangements, rotation of the blades may produce sound waves having multiple different frequencies. Accordingly, the dimensions of each of the Helmholtz resonators 50A-50F may be varied so that each Helmholtz resonator 50A-50F reflects a different frequency of sound.

Referring now to FIG. 5B, a cross-sectional view of another variation of the shroud 14A of FIG. 1 is shown. The shroud 52 includes a shroud body 54 that defines a hollow interior 56 and a plurality of annular openings 58A, 58B, and 58C. As shown, the shroud 52 includes three annular openings 58A-58C. However, the shroud 52 can include any suitable number of annular openings. The shroud 52 also includes one or more walls 60A and 60B located inside the hollow interior 56 that are configured to divide the hollow interior 56 into a plurality of cavities 62A, 62B, and 62C.

As shown, the shroud 52 includes two walls 60A and 60B configured to divide the hollow interior 56 into three cavities 62A-62C. However, the shroud 52 can include any suitable number of walls configured to divide the hollow interior 56 into any suitable number of cavities. As shown in FIG. 5B, the walls 60A and 60B may extend annularly within the hollow interior 56 (e.g., the walls 60A and 60B extend substantially along the x-y plane of FIG. 1). Each of the cavities 62A-62C can define a volume. Additionally, each of the annular openings 58A-58C defines a height and a neck that extends to the cavities 62A-62C. The thickness of the shroud body 54 can define a length of each of the necks.

The shroud 52 also includes a plurality of Helmholtz resonators 64A, 64B, and 64C. The Helmholtz resonators 64A-64C may be defined by the plurality of cavities 62A-62C and the annular openings 58A-58C. As shown, the shroud 52 includes 3 Helmholtz resonators 64A-64C. However, the shroud 52 can include any suitable number of Helmholtz resonators. Like the Helmholtz resonator 32 of FIGS. 2-3B and the Helmholtz resonators 50A-50F of FIG. 5A, the Helmholtz resonators 64A-64C of FIG. 5B are configured to reflect sound generated by the rotation of the blades out of the shroud body 54.

Each of the Helmholtz resonators 64A-64C can define a resonant frequency, which may be a function of the volume of the cavity 62A-62C, the cross-sectional area of each of the annular openings 58A-58C, and the length of each of the necks. The resonant frequency of the Helmholtz resonators 64A-64C may be based on the frequency of the sound emitted by rotation of the blades. In some arrangements, rotation of the blades may produce sound waves having multiple different frequencies. Accordingly, the dimensions of each of the Helmholtz resonators 64A-64C may be varied so that each Helmholtz resonator 64A-64C reflects a different frequency of sound.

Figure 6:
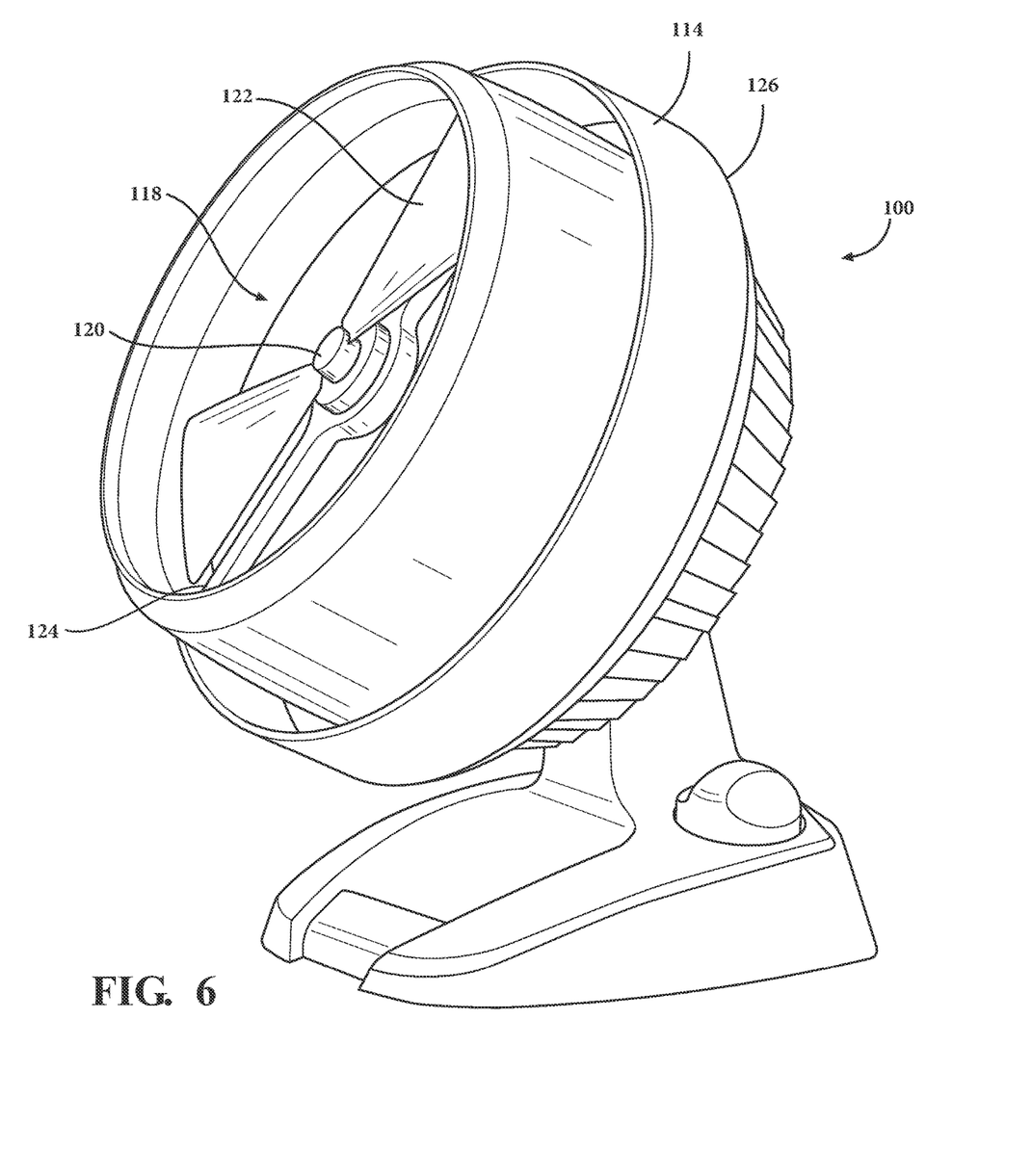
FIG. 6 illustrates an example of an air moving device including a shroud, where the air moving device is a fan.

As mentioned before, the sound mitigation system described herein can be used in a variety of different applications where the movement of air occurs and is not just limited to vehicles. For example, FIG. 6 illustrates another example of an air moving device that can utilize the sound mitigation system. In this example, the air moving device is in the form of a fan 100. The fan 100 be a table fan, as shown, or the fan 100 can be any type of fan, such as a pedestal fan, a floor fan, a wall-mounted fan, a tower fan, an exhaust fan, an industrial fan, etc.

The fan 100 includes a propeller 118, including a motor 120, one or more fan blades 122, and a mount 124 for mounting the propeller 118. However, in addition to these components, the fan 100 also includes a shroud 114, which is similar to the shrouds 14A-14D. The shroud 114 may include a shroud body 126. As such, any description regarding the shrouds 14A-14D is equally applicable to the shroud 114. Here, the fan blades 122 are configured to be rotated by the motor 120 to push air through the fan 100. Due to this movement, the rotation of the blades 122 may produce sound waves that may be heard by a person near the fan 100, and in such instances, it may be advantageous to mitigate noise produced by the fan 100.

Accordingly, like the shrouds 14A-14D, the shroud 114 can include one or more Helmholtz resonators. For example, the shroud body 126 can include an annular cavity and an annular opening, both defining a Helmholtz resonator. In another example, the shroud body 126 can include a hollow interior, one or more walls dividing the hollow interior into cavities, one or more annular openings, and a plurality of Helmholtz resonators defined by the cavities and the annular opening(s). The Helmholtz resonator(s) are configured to reflect sound produced by rotation of the blades 122 out of the shroud body 126 in order to mitigate the amount of noise heard by a person near the fan 100.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A device, comprising:
an aerial vehicle including a rotor having one or more blades;
a shroud body for the rotor configured to surround the one or more blades, the shroud body having a conically shaped inner diameter directly facing the rotor defined between a top edge and a bottom edge, the top edge having a larger circumference than the bottom edge, and the shroud body defining an annular cavity and an annular opening that extends continuously along the conically shaped inner diameter of the shroud body, the annular opening facing the one or more blades; and
a Helmholtz resonator defined by the annular cavity and the annular opening and configured to reflect sound generated by rotation of the one or more blades toward the top edge and out of the shroud body.

2. The device of claim 1, wherein:
the annular cavity defines a volume;
the annular opening defines a neck that extends to the annular cavity; and
the thickness of the shroud body defines the length of the neck.

3. The device of claim 2, wherein a height of the annular opening is substantially 25% or less of a height of the shroud body.

4. The device of claim 2, wherein the resonant frequency of the Helmholtz resonator is a function of the volume of the annular cavity, a cross-sectional area of the annular opening, and the length of the neck, and is based on the frequency of the sound emitted by the rotation of the one or more blades.

5. The device of claim 2, wherein:
the one or more blades are located between the top edge and the annular opening; and
the amount of reflected sound is a function of a distance from the top edge to the annular opening.

6. The device of claim 5, wherein the amount of reflected sound is optimized when the distance from the top edge to the one or more blades is 15 millimeters.

7. The device of claim 1, wherein the one or more blades are located between the bottom edge and the annular opening.

8. The device of claim 1, wherein the one or more blades are one or more propellers.

9. A device, comprising:
an aerial vehicle including a rotor having one or more blades;
a shroud body for the rotor configured to surround the one or more blades, the shroud body having a conically shaped inner diameter directly facing the rotor and defined between a top edge and a bottom edge, the top edge having a larger circumference than the bottom edge, and the shroud body defining a hollow interior and an annular opening that extends continuously along the conically shaped inner diameter of the shroud body;
one or more walls located inside the hollow interior and configured to divide the hollow interior into a plurality of cavities; and
a plurality of Helmholtz resonators defined by the plurality of cavities and the annular opening and configured to reflect sound generated by rotation of the one or more blades toward the top edge and out of the shroud body.

10. The device of claim 9, wherein:
each of the plurality of cavities defines a volume;
the annular opening defines a neck that extends to each of the annular cavities; and
the thickness of the shroud body defines the length of the neck.

11. The device of claim 10, wherein a height of the annular opening is substantially 25% or less of a height of the shroud body.

12. The device of claim 10, wherein the resonant frequency of each of the plurality of Helmholtz resonators is a function of the volume of the annular cavity, the cross-sectional area of the annular opening, and the length of the neck, and is based on the frequency of the sound emitted by the rotation of the one or more blades.

13. The device of claim 10, wherein:
   the one or more blades are located between the top edge and the annular opening; and
   the amount of reflected sound is a function of a distance from the top edge to the annular opening.

14. The device of claim 9, wherein the one or more blades are located between the bottom edge and the annular opening.

15. The device of claim 9, wherein the one or more walls are equally spaced inside the hollow interior such that the plurality of Helmholtz resonators have equal volumes.

16. The device of claim 9, wherein the one or more walls are unequally spaced inside the hollow interior such that the plurality of Helmholtz resonators have unequal volumes, and wherein the Helmholtz resonators, as a function of their unequal volumes, are each configured to reflect sounds having different resonant frequencies.

17. The device of claim 9, wherein the one or more walls extend longitudinally within the hollow interior from a top edge of the shroud body to a bottom edge of the shroud body.

18. The device of claim 9, wherein the one or more walls extend annularly within the hollow interior, and further comprising:
   a plurality of annular openings such that the plurality of Helmholtz resonators are defined by the plurality of cavities and the plurality of annular openings.

\* \* \* \* \*